May 16, 1967  E. C. BRAINARD II  3,319,465
APPARATUS FOR THERMAL CURRENT NAVIGATION
Filed Dec. 31, 1964  2 Sheets-Sheet 1

INVENTOR.
EDWARD C. BRAINARD, II
BY Kenway, Jenney & Hildreth

ATTORNEYS

May 16, 1967  E. C. BRAINARD II  3,319,465
APPARATUS FOR THERMAL CURRENT NAVIGATION
Filed Dec. 31, 1964  2 Sheets-Sheet 2
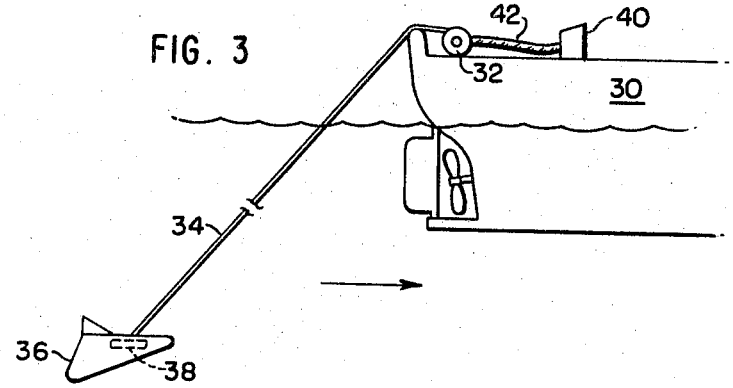
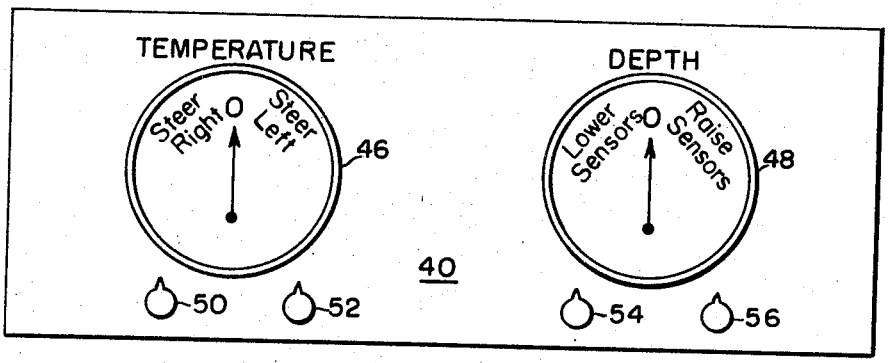
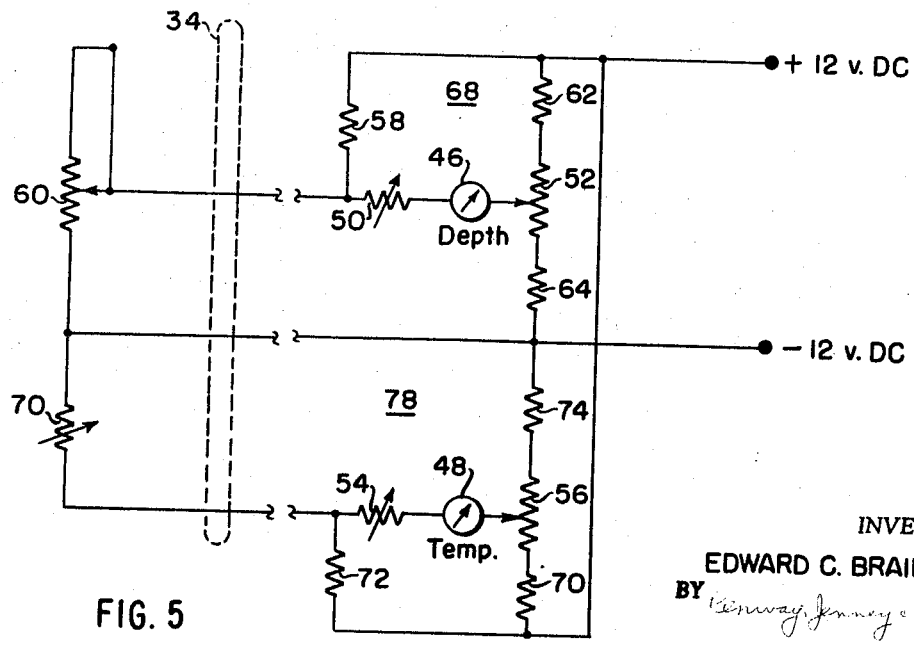
INVENTOR.
EDWARD C. BRAINARD, II
BY
ATTORNEYS

United States Patent Office 3,319,465
Patented May 16, 1967

3,319,465
APPARATUS FOR THERMAL CURRENT
NAVIGATION
Edward C. Brainard II, Marion, Mass., assignor to Braincon Corporation, Marion, Mass., a corporation of Massachusetts
Filed Dec. 31, 1964, Ser. No. 422,655
5 Claims. (Cl. 73—178)

My invention relates to apparatus for navigating a ship or other water-borne vessel. More particularly, it relates to apparatus for navigating a vessel in an area having a thermal current to take advantage of the increased water velocity associated with the current.

It is well known that in many of the large bodies of water on the surface of the earth, there exist areas where the water exhibits a nonuniform thermal gradient which gives rise to disturbance currents or streams. These thermal gradients are caused in part by the topography of adjacent land masses which alter the heating and cooling rate of the mass of water adjacent the land area and in part by the action of other geostrophic forces such as the Coriolis acceleration. The thermal currents so generated flow through the body of water with which they are associated with an increased velocity relative to other areas of the water body and often do so in a consistent manner such that the direction and velocity of the current stream may be plotted with reasonable accuracy.

An example of such a current is the Gulf Stream which exists in the north Atlantic Ocean and which is considered to be a transition zone between the warm waters of the Sargasso Sea and the colder waters of the continental shelf and slope. This stream flows in a northerly direction from the southern tip of Florida to the coastal region of North Carolina, at which point the stream turns and flows in a generally easterly direction. The Gulf Stream is of variable width at different portions along its length, having widths of the order of 8 to 10 miles. The velocity of the Gulf Stream, as is typical of these ocean currents, varies across its width, the maximum velocity being of the order of three to five knots in certain segments of the stream; the location of this area of increased velocity is not constant but may vary from day to day in the course of the year.

A series of observations at various stations along the length of the stream has indicated that a cross-sectional segment of the stream possesses a definite thermal structure which is related to the maximum velocity of the stream in a determinable fashion. In particular, it has been found that if lines of constant temperature (isotherms) are plotted on a graph showing the relationship between the depth of the isotherm and the distance across the Gulf Stream, the maximum current velocity will be found to occur in that part of the stream in which the isotherms have their maximum slope when plotted with respect to depth.

This fact may be utilized to advantage in enabling vessels navigating in the area of the Gulf Stream and of other ocean currents exhibiting this characteristic to gain additional speed by operating in the area of maximum current velocity. Prior attempts to track the area of increased current velocity involved the intermittent tracking of the 15° C. isotherm at a depth of 200 meters. The depressive forces required to maintain a sub-surface test vehicle at this depth, however, preclude use of such a technique for all but experimental purposes. Further, the intermittent nature of such measurements precluded the tracking of the continually varying maximum velocity segment of the stream with any great accuracy. I have found that by tracking an isotherm of higher temperature at a lesser depth, the maximum velocity of the current stream can be predicted with an accuracy that compares favorably with that obtained from tracking the lower temperature isotherm at greater depths. In particular, I have found that an isotherm of approximately 22° C. at a depth of approximately 60 meters is sufficient to adequately predict the area of maximum current velocity in the Gulf Stream. Further, I have developed apparatus which can be utilized to track the isotherm continuously at this depth, thus giving constant information to the ship's helmsman and enabling the ship to stay in the area of maximum current velocity at all times.

To give an example of the results achieved with the apparatus of my invention, a vessel proceeding from the Florida straits to Cape Hatteras and attempting to position itself in the predicted position of the Gulf Stream by conventional navigational techniques and in particular with loran can achieve a "lift," from the Gulf Stream, i.e. an increase in speed over the ground as compared with speed through the water, of about two knots. Using the apparatus of my invention, which continuously monitors an isotherm, a lift of about 4 to 4.5 knots can be achieved. Additionally, the apparatus of my invention is relatively simple and easy to handle and can readily be used on a wide variety of vessels.

Accordingly, it is an object of my invention to provide improved apparatus for navigational use in areas having thermal currents in order to take advantage of the increased relative velocity of water in the current. A further object of my invention is to provide apparatus for continuously tracking a sub-surface isotherm.

Another object of my invention is to provide apparatus of the type described which provides a continuous indication of the proper direction to steer the vessel on which it is mounted to enable the vessel's helmsman to maintain the vessel in the maximum velocity portion of the stream.

A still further object of my invention is to provide apparatus of the type described which is economical in cost and simple and reliable in operation.

Other and further objects and features of my invention will in part be obvious and will in part appear below in the following detailed description of a preferred embodiment thereof which has been selected for purposes of illustration and is shown in the accompanying drawings in which:

FIGURE 3 is a diagrammatic view of apparatus for continuously monitoring the sub-surface temperature and pressure;

FIGURE 4 is a top plan view of a navigation console containing the temperature and pressure indicating meters used with the apparatus of my invention; and FIGURE 5 is a circuit diagram, in schematic form, showing the measuring circuit for the temperature and pressure transducers which are carried by the sub-surface vehicle shown in FIGURE 1.

In accordance with my invention, I provide a vehicle suitable for towing underwater and capable of operating at a fixed depth below the surface of the water. The towing vehicle has temperature- and pressure-sensitive instruments mounted therein to continuously monitor the temperature of the water at a given depth. A towing cable, attached at one end to the underwater vehicle and at the other end thereof to the vessel or towing ship, carries electrical cables by which an electrical signal proportional to the measured temperature and pressure may be transmitted from the instrument sensor to a navigation console on board the vessel itself; the navigation console provides a display of measured temperature and pressure so that the deviation from the temperature of the selected isotherm at a given depth may readily be determined after the indicators or meters on the console have been set to provide zero readings for a selected temperature and pressure. The ship is nagivated in a fashion such as to minimize the deviation of the measured values from the zero values, a rise in the measured temperature at a given depth indicating that a correction in the vessel's course must be made in a first direction and a decrease in temperature indicating that a correction in course in the opposite direction must be made.

Figure 1:
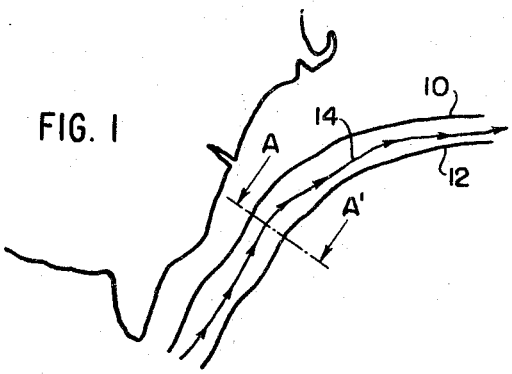
FIGURE 1 is a sketch of a chart showing a selected portion of the Gulf Stream.

FIGURE 1 shows a diagram of a selected portion of the Gulf Stream within the boundaries of the contour lines 10 and 12; the approximate location and direction of the maximum current velocity within the Gulf Stream is indicated by the line 14. The Gulf Stream flows northerly from the southern tip of Florida and roughly parallels the coast line until the Carolinas, at which point it begins to turn easterly. The stream is of variable width and the location of the stream shifts on both daily and yearly cycles.

Figure 2A:
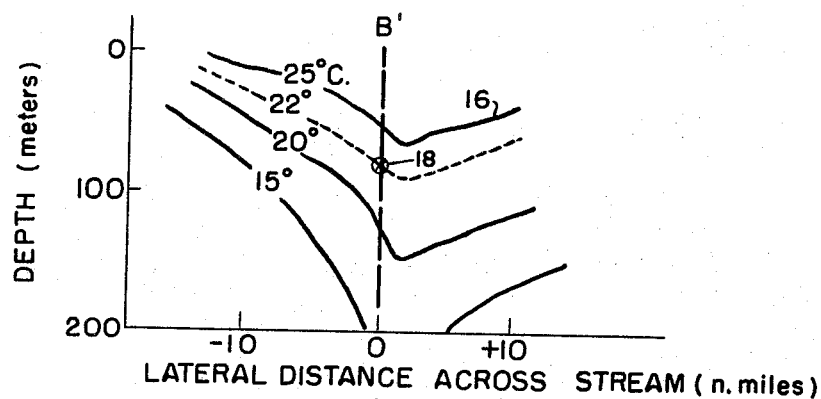
FIGURE 2(a) is a plot showing the variation of the sub-surface temperature with depth and with distance across the Gulf Stream.
Figure 2B:
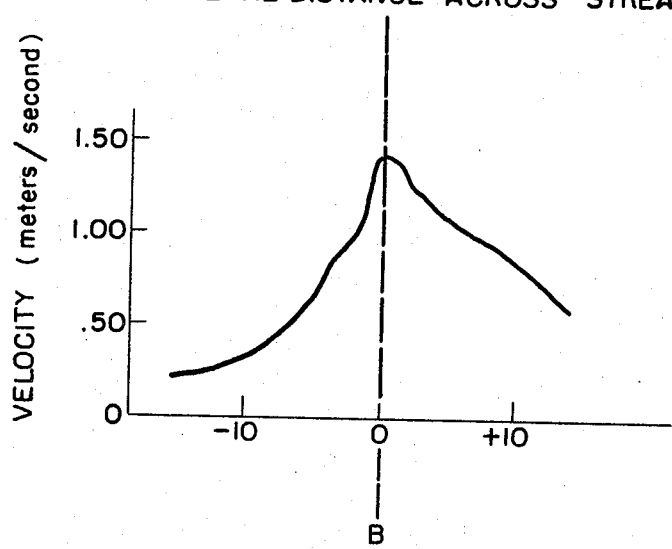
FIGURE 2(b) is a plot illustrating the variation in the velocity of the Gulf Stream with distance across the stream.

FIGURE 2(a) shows a cross-sectional plot taken along the lines A–A' of FIGURE 1. The curves 16 are a series of isotherms obtained by measuring the temperature at a given depth and at a given distance across the stream and plotting the temperature points so obtained against depth and distance across the stream, lines of equal temperature being connected together to form the selected isotherms. It will be noted that the isotherms dip sharply in the area of the line marked B–B' in FIGURE 2(a). In the vicinity of this line, the thermal gradient with respect to depth, that is, the rate of change of temperature with respect to depth, is near its minimum, while the thermal gradient with respect to lateral distance across the stream is near its maximum; further, the area of maximum current velocity is also within this vicinity as may be seen in FIGURE 2(b).

From this it may be seen that the determination of the maximum temperature gradient with respect to lateral distance across the stream or, alternatively, the determination of the minimum temperature gradient with respect to depth at a fixed point within the stream will enable one to determine the area in which the maximum current velocity occurs. Alternatively, navigational charts providing information similar to that shown in FIGURE 2(a) may be utilized to locate the area of maximum current velocity by towing the temperature sensor at a given depth until a selected isotherm in the vicinity of the maximum velocity as determined from the chart is located. Having located this area, a vessel may maintain itself within this area by continuously monitoring the selected isotherm at a relatively constant depth below the surface of the water. For purposes of illustration, the 22° C. isotherm will be selected.

The point 18 in FIGURE 2(a) indicates the location and depth of the 22° C. isotherm. It will be seen that if this isotherm is used as a reference point and if the subsurface temperature is continuously monitored at a constant depth corresponding to that at the selected point of this isotherm, deviations to the right or left of the selected reference point will be indicated by increases or decreases respectively in the measured temperature. Accordingly, by navigating the vessel so as to minimize these temperature deviations, one is able to remain at all times in the area of the maximum current velocity.

Referring now to FIGURE 3, there is shown therein one embodiment of apparatus constructed according to my invention by which a vessel may be maintained in the vicinity of the maximum current velocity of a thermal stream. FIGURE 3 shows a vessel 30 having a winch 32 on which a cable 34 may be wound. The cable 34 is connected at the other end thereof to an underwater vehicle 36 which carries an instrumentation package 38 within its body. The cable 34 has one or more electrical conductors integrally mounted therein for transmitting signals from the instrumentation package 38 in the vehicle and is connected to a navigation console 40 such as is shown in FIGURE 4 by means of an electrical connecting cable 42. The vehicle 36 in FIGURE 3 may be any of a number of vehicles capable of operating under water. A preferred form of vehicle, however, is shown in United States Patent No. 3,137,264 issued June 16, 1964, to E. C. Brainard II et al. The vehicle shown therein utilizes a delta wing configuration having a negative dihedral and a vertical fin at the aft end thereof and possesses a high degree of both lateral and vertical stability; accordingly this vehicle may be towed over a wide range of speeds and yet maintain substantially a constant depth below the surface of the water. In practice, I have found that using this vehicle, the transducers are maintained at a substantially constant depth over a velocity range of 8 to 16½ knots.

In operation, the vehicle 36 is positioned in the water behind the stern of the ship 30 and the cable 34 is unwound from the winch 32 until the vehicle 36 reaches the desired depth as determined by the length of the cable and the speed of the vessel. The instrumentation package 38 may, in addition to a temperature sensing device, also contain a pressure sensitive device in order to provide an indication of the depth at which the vehicle 36 is operating. It will be apparent, of course, that other methods of determining the depth at which the vehicle 36 is operating may be utilized; thus the depth could be calculated from a knowledge of the length of the cable from the stern of the vessel to the vehicle and the angle which the cable makes with the vertical when the vehicle is towed. With the vehicle 36 positioned in the area of the maximum current velocity, the vessel 30 is maneuvered until the temperature reading which is transmitted from the instrumentation package 38 which is transmitted over the cable 34 to the navigation console 40 corresponds to the desired isotherm which has been preselected for tracking. When the measured and selected isotherms thus coincide, the ship 30 is operating in the proper area and maximum advantage of the current velocity is thereby obtained.

If the vessel 30 moves away from the selected isotherm in an easterly direction, the measured temperature as read on the console 40 will increase from the value which had been previously selected. To correct this, the vessel must be navigated in a westerly direction until the measured and desired temperature values again coincide. Similarly, if the vessel moves away from the selected isotherm in a westerly direction, the measured temperature will be seen to decrease and the vessel must be navigated in an easterly direction to compensate for this increase. Thus, the magnitude and direction of the deviation of the measured temperature from the selected temperature will provide an indication of the magnitude and direction of the correctional course change or heading which must be applied to the vessel to return the vessel to the area of maximum current velocity.

FIGURE 4 shows a simple navigational console which forms part of my navigation apparatus and which may readily be utilized to present the necessary navigational information to the helmsman. The console 40 contains a temperature indicator 46 having a sensitivity control 50 and a zero setting control 52, and a depth indicator 48 having sensitivity and zero setting controls 54 and 56 respectively. The sensitivity controls 50 and 54 permit the operator to adjust the scale of the indicators 46 and 48 to that range of temperature and depth over which it is desired to operate the navigational system. Similarly, the zero setting controls 52 and 56 allow the operator to select a desired isotherm at a preselected depth as a zero reference; the console 40 will then monitor the deviation of the temperature and depth from this selected point. The indicator 46 translates the measured temperature readings directly into steering commands, thus obviating constant reference to charts or other navigational aids in attempting to take maximum advantage of the increased velocity of the thermal stream.

It will be apparent to those skilled in the art that other means of presenting the desired information may be utilized with my navigation apparatus. Thus, for example, the indicators 46 and 48 may be replaced by a set of colored lamps, each of the parameters (temperature and depth) having associated therewith at least one pair of these lamps, one of these lamps indicating that the parameter with which it is associated has exceeded a preselected value in a first direction, the other of these lamps indicating that the parameter has exceeded a preselected value in the opposite direction. If desired, a third lamp could be utilized with each parameter to indicate that the system is operating within the preselected limits. Similarly, an audio signaling system could be utilized to present the desired information, a signal at a first sound or frequency level indicating that the parameter with which the audio signal is associated has exceeded a preselected range in a first direction, and a signal of a different sound or frequency level indicating that the parameter has exceeded the preselected range in the opposite direction. It will also be apparent to those skilled in the art that various combinations of these methods may be used to present the desired information in accordance with the needs and desires of the user of the navigation apparatus.

FIGURE 5 shows a circuit diagram of a transducer and measuring circuit suitable for use with my navigation apparatus. A resistor 58 forms the first arm of an electrical bridge circuit, the pressure sensitive potentiometer 60, which is being used as a variable resistor, forming the second arm of this bridge. Resistors 62 and 64, together with the upper and lower sections respectively of the potentiometer 52, form the third and fourth arms of the bridge. The meter 46 is connected in series with the sensitivity adjusting resistor 50 and the meter and sensitivity resistor are connected across a first pair of terminals of the bridge circuit 68, a power supply being connected across the opposite pair of bridge terminals. In similar fashion, a temperature sensitive resistor 70 forms one arm of the bridge circuit 78, the other arms being formed by a resistor 72, a resistor 74 in series with the upper end of the potentiometer 56, and a resistor 76 in series with the lower section of the potentiometer 56. The temperature indicating meter 48 is connected in series with the variable resistor 54 and the meter and resistor are connected across a first pair of terminals of the bridge circuit, a power supply shown as being plus 12 volts D.C. and minus 12 volts D.C. being connected across the other pair of terminals of the bridge circuit.

The pressure transducer 60, consisting of a pressure sensitive poteniometer, and the temperature transducer 70, consisting of a thermistor or other temperature sensitive resistance, are mounted in the transducer package 38 of the underwater vehicle 36 shown in FIGURE 1, and are connected to the bridge circuits 68 and 78 respectively via the cable 34. The variable resistances 50 and 54 are adjusted to provide the desired sensitivity for the depth and temperature indicators 46 and 48 respectively. The potentiometer 52 which is connected to the indicator 46 and the potentiometer 56 which is connected to the indicator 48 are adjusted to provide a zero reference level for the indicators when the transducers 60 and 70 indicate that they are operating at the desired temperature and depth. With the units thus iniially calibrated, any deviation of temperature or depth from the initially calibrated value will be applied across the bridge circuit 68 or 78 respectively and will appear as an output signal across the indicator 46 or 48 respectively. Thus, the magnitude and direction of the deviations from the selected temperature or pressure which the transducers are tracking will be readily apparent by observation of the indicators 46 and 48 and appropriate steering corrections of the vessel may be initiated to reduce the deviations of the indicators to zero.

In practice it will be found that if the underwater vehicle described in United States Patent No. 3,137,264 is used as the depressor vehicle for the instrumentation package containing the transducers 60 and 70, the depth at which the vehicle operates will not vary greatly even though the vessel towing the underwater vehicle varies its speed over a broad range. Thus, the reading of the indicator meter 46 will remain fairly constant and the helmsman's attention can be devoted mainly to monitoring the temperature indicator meter 48. The meters 46 and 48 may be calibrated in any convenient unit; in FIGURE 4, the output indications of the meters are shown as simple "steer right" and "steer left" indications for the temperature indicator 46 and as "raise sensors" and "lower sensors" for the depth indicator 48. The magnitude of the corrections which must be applied to the vessel to return the indicator pointer of the meter to zero is then shown by the amount by which the indicator needle has departed from zero and the direction is shown by the direction of the deviation of the indicator needle from zero; it will be apparent that the meters 46 and 48 may be calibrated to give output readings in other units of measurement if desired. Further, the transducers and their associated measuring instruments may use pneumatic or other means of transmitting signals, although it has been found most convenient to utilize an electrically operated system in my apparatus.

It will thus be seen that I have provided an efficient means of navigating a vessel in order to take the maximum advantage of increased current velocities associated with areas having thermal currents. Further, I have provided a method of navigation which is relatively simple and easy to follow and which requires a minimum of additional equipment. I have also provided a simple yet efficient apparatus for performing the required measurements for use in my method of navigation.

It will thus be seen that the objects set forth above, among those made apparent from the preceding description, are efficiently attained and, since certain changes may be made in the above constructions without departing from the scope of the invention, it is intended that all matter obtained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Having described my invention, I claim:

1. Apparatus for navigating a vessel in a body of water having a thermal current flowing therein to continuously position the vesesl above a selected isotherm of the thermal current, comprising in combination, a temperature transducer for measuring the temperature of the fluid surrounding the transducer, said transducer providing an electrical signal proportional to the temperature of said surrounding fluid, depressor means towed by said vessel, said transducer being mounted in said depressor, indicating means mounted in said vessel, said indicating means being responsive to the electrical signals from the transducer and having calibrating means associated therewith to set the indicating means to provide a zero indication when the signal from the transducer has a predetermined value corresponding to the temperature of said selected isotherm, said indicating means providing an indication of the magnitude and direction of departures of the transducer from the selected isotherm, thereby indicating the correction to be made in the vessel heading to return it to a position above said isotherm.

2. Apparatus for navigating a vessel in a body of water having a thermal current flowing therein to continuously position the vessel above a selected isotherm of the thermal current, said appartus comprising, in combination, a temperature transducer for measuring the temperature of the fluid surrounding the transducer, a depressor vehicle for maintaining said transducer at a predetermined depth within said fluid, means connecting said transducer to said depressor vehicle, a towing cable connected to the depressor vehicle, an indicator responsive to signals from the transducer, said indicator including means for establishing a reference level corresponding to a preselected temperature, and signal transmission means mounted integrally with the towing cable and interconnecting the transducer and the indicator, whereby said indicator provides an indication of the deviation of the measured temperature from the preselected temperature.

3. Navigation apparatus for water-borne vessels comprising, in combination, a transducer for providing an electrical indication of the temperature of a fluid surrounding said transducer, depressor means maintaining said transducer at a relatively constant depth below the surface of the fluid, towing means interconnecting said vessel and said depressor whereby a towing force is imparted to said depressor by the vessel as the vessel is navigated through the fluid, an electrical measuring circuit mounted on said vessel, said measuring circuit having at least one indicator responsive to signals from said transducer and having means associated therewith for setting said measuring circuit for a zero output signal when said transducer provides a signal corresponding to a given temperature, and means connecting the electrical signals from said transducer to said measuring circuit whereby a signal corresponding to the temperature of the fluid surrounding the transducer is supplied by the measuring circuit, said circuit providing an indication of the relative magnitude and direction of departures of the vessel from the area of a preselected sub-surface isotherm at a given depth.

4. The combination defined in claim 1 in which said transducer means comprises at least one thermistor, and in which said measuring circuit includes an electrical bridge circuit, said thermistor forming one of the arms of said bridge.

5. The combination defined in claim 1 wherein said depressor means comprises a vehicle having a pair of delta shaped wings with negative dihedral, said depressor means thereby generating a negative lift force when being towed through the fluid, said force having a magnitude greater than the static weight of said vehicle, whereby said sensor is maintained at a relatively constant depth below the surface of the fluid.

References Cited by the Examiner
UNITED STATES PATENTS

| | | | |
|---|---|---|---|
| 2,649,715 | 8/1953 | Goble | 73—362 |
| 2,703,009 | 3/1955 | Ewing et al. | 73—178 |
| 2,750,794 | 6/1956 | Downs | 73—53 |
| 2,960,866 | 11/1960 | Pharo et al. | 73—362 |
| 3,137,264 | 6/1964 | Brainard et al. | 114—235 |
| 3,221,556 | 12/1965 | Campbell et al. | 73—362 |

LOUIS R. PRINCE, *Primary Examiner.*

N. B. SIEGEL, *Assistant Examiner.*